United States Patent [19]

Nishimura et al.

[11] Patent Number: 4,558,678
[45] Date of Patent: Dec. 17, 1985

[54] FUEL FEEDING APPARATUS FOR INTERNAL COMBUSTION ENGINE

[75] Inventors: Yutaka Nishimura, Katsuta; Hiroshi Kuroiwa, Hitachi; Yoshishige Oyama, Katsuta; Takao Teranishi, Hitachi, all of Japan

[73] Assignee: Hitachi, Ltd., Tokyo, Japan

[21] Appl. No.: 465,342

[22] Filed: Feb. 9, 1983

[30] Foreign Application Priority Data

Feb. 10, 1982 [JP] Japan .................................. 57-20267

[51] Int. Cl.$^4$ ........................................... F02M 51/00
[52] U.S. Cl. ...................................... 123/494; 73/118
[58] Field of Search ................... 123/494, 482; 73/118, 73/204

[56] References Cited

U.S. PATENT DOCUMENTS

| 4,420,972 | 12/1983 | Kuroiwa et al. | 73/118 |
| 4,442,818 | 4/1984 | Kashiwaya et al. | 123/494 |
| 4,446,824 | 5/1984 | Endo et al. | 123/494 |

Primary Examiner—Andrew M. Dolinar
Attorney, Agent, or Firm—Antonelli, Terry & Wands

[57] ABSTRACT

A fuel feeding apparatus for internal combustion engines, of the type having a heat-type air flow meter disposed in a bypass air passage detouring an air-intake passage, an air metering valve adapted to be actuated by a proportional type electromagnetic device to control the flow rate of air in the bypass air passage substantially at a constant level in response to the output signal from the heat-type air flow meter, and a fuel metering valve adapted to be actuated by the proportional type electromagnetic device simultaneously with the control of air flow rate by the air metering valve. A pulsation suppressing means is disposed in the bypass air passage to suppress the pulsation of air pressure in the latter thereby to decrease the measurement error in the heat-type air flow meter.

6 Claims, 22 Drawing Figures

FUEL FEEDING APPARATUS FOR INTERNAL COMBUSTION ENGINE

BACKGROUND OF THE INVENTION

The present invention relates to a fuel feeding apparatus for internal combustion engines such as automotive engines and, more particularly, to a fuel feeding apparatus having an electronic controller for controlling fuel feeding rate.

A typical known fuel feeding apparatus for internal combustion engines has a fuel injection portion constituted by an electromagnetic valve and disposed in the air-intake passage at the upstream side of the throttle valve and an air flow meter for detecting the air flow rate and disposed in the air-intake passage. In operation, the fuel is injected into the air-intake passage intermittently through a control of the width of the valve opening pulse for actuating the electromagnetic valve in accordance with an air flow rate signal derived from the air flow meter.

This type of fuel feeding apparatus, however, tends to suffer from a lack of uniformity of the mixture due to the intermittent fuel injection. In addition, a high accuracy of the air flow meter, as well as a complication of signal processing circuit connected to the air flow meter, is required to permit the direct detection of the air flow rate by the air flow meter.

As a measure for overcoming the above-described problems of the prior art, in, for example, U.S. Pat. No. 4,442,818, a fuel feeding apparatus is proposed wherein an air flow meter is disposed by a bypass air passage detouring the air intake passage for enabling a sensing of a change in the air flow rate.

In this proposed fuel feeding apparatus, the flow rate of air flowing through the bypass air passage is controlled by a air metering valve at a substantially constant level through a feedback of the output signal from the air flow meter. Simultaneously, the fuel feeding rate is controlled by a proportional type electromagnetic device which drives the air metering valve. This fuel feeding apparatus advantageously ensures a high response characteristics of the fuel feeding because the fuel feeding rate is automatically controlled in response to a change in the air flow rate by the proportional type electromagnetic device.

On the other hand, however, this fuel feeding apparatus leaves room for improvement in the following respect. Namely, when the air flow meter is constituted by a heat-type flow meter which produces an electric output corresponding to the heat carried away from a heat-sensitive resistor in accordance with the air flow rate, the flow rate of air is measured out only for the air flowing forwardly but also for the air flowing backwardly. Therefore, in the event that the intake air flow is a pulsating one involving a backward flow as in the case of heavy load operation, e.g. low-speed fuel-throttle operation of the engine, the output signal derived from this air flow meter is considerably greater than the signal corresponding to the actual intake air flow rate. Therefore, it is often experienced that the air-fuel ratio of the mixture actually supplied largely deviates from the set air-fuel ratio during heavy load operation of the engine. Hitherto, no effective measures has been proposed for avoiding this problem.

SUMMARY OF THE INVENTION

Accordingly, an object of the invention is to provide a fuel feeding apparatus improved to permit the supply of air-fuel mixture following up the set air-fuel ratio over the entire range of the engine operation, to thereby overcome the above-described problems of the prior art.

Another object of the invention is to provide a fuel feeding apparatus in which the air flow rate is detected by a heat-type flow meter disposed in a bypass air passage to permit the supply of air-fuel mixture at the optimum air-fuel ratio even in the heavy load operation of the engine, without requiring a complicated electronic controller.

Still another object of the invention is to provide a less-expensive fuel feeding apparatus having a superior performance with good response characteristics.

To these ends, according to the invention, there is provided a fuel feeding apparatus of the type having a heat-type air flow meter disposed in a bypass airpassage detouring the air-intake passage, an air metering valve disposed in the bypass air passage for controlling the air flow rate substantially at a constant level in response to the output signal from the heat-type air flow meter, a proportional type electromagnetic device for driving the air metering valve, a fuel metering valve driven by said proportional-type electromagnetic device simultaneously with the air metering valve to thereby control the fuel feeding rate, and a pulsation suppressing means for suppressing the pulsation of air in the bypass air passage to thereby decrease the measurement error of the heat-type air flow meter.

These and other objects, features and advantages of the invention will become more apparent from the following description of the preferred embodiments taken in conjunction with the accompanying drawings.

DETAILED DESCRIPTION

Figure 1:
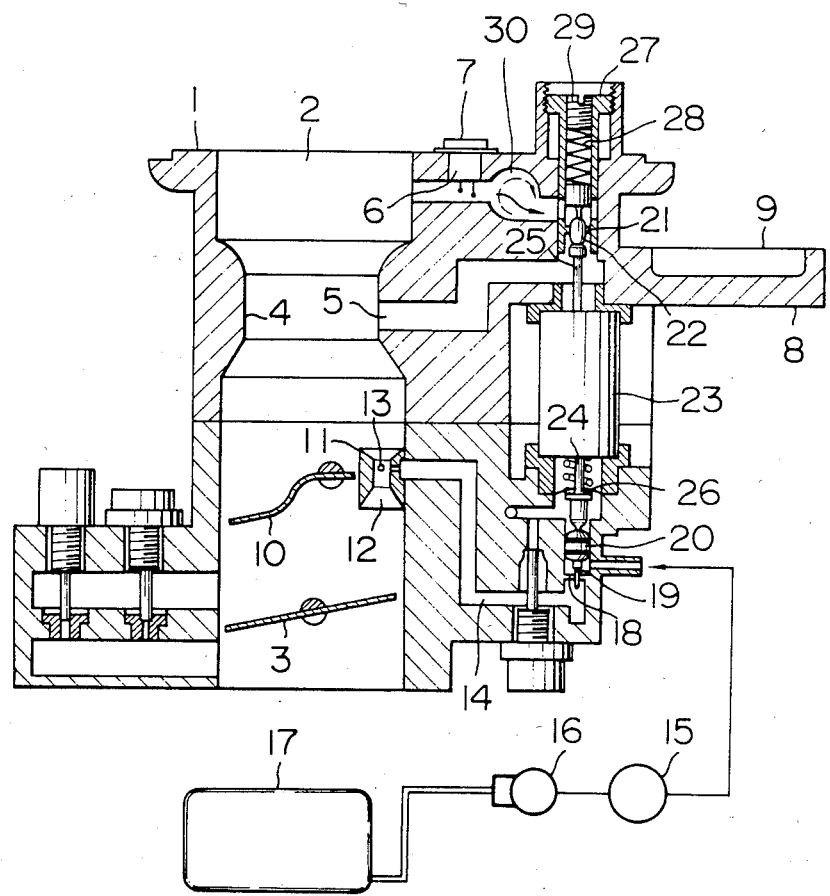
FIG. 1 is a sectional view of a fuel feeding apparatus in accordance with an embodiment of the invention.

Referring now to the drawings wherein like reference numerals are used throughout the various views to designate like parts and, more particularly, to FIG. 1, this figure will be used also for the description of the construction and operation of a conventional fuel feeding apparatus because the portions of the fuel feeding apparatus of the invention other than the pulsation suppressing means are materially identical to those of the fuel feeding apparatus of the prior art.

As shown in FIG. 1, a body 1 of the fuel feeding apparatus is provided with an air-intake passage extending therethrough, with a throttle valve 3 being disposed in the air-intake passage the opening degree of which is changed in response to the movement of an accelerator pedal. An auxiliary throttle valve 10, adapted to be opened by the dynamic pressure of the flow of intake air, is disposed at the upstream side of the throttle valve 3 and a venturi portion 4 is formed at the upstream side of the auxiliary throttle valve 10. The venturi portion 4 has a throat having the minimum cross-sectional area and communicated with the portion of the air-intake passage 2 upstream from the venturi portion 4 through a bypass air passage 5.

A hot wire sensor 6 is disposed at an intermediate portion of the by-pass air passage 5 to serve as the heat-type air flow meter. The hot wire sensor 6 has heat-sensitive resistors projected into the passage 5 and adapted for heat generation and temperature compensation, respectively. A signal processing circuit 7 for processing the signal from the hot wire sensor 6 is attached to the upper side of the main body 1. The output from the signal processing circuit 7 is delivered to a computer 9 accomodated by a holder 8 formed on the body 1 of the fuel feeding apparatus. An air orifice 21 and a needle valve 22, for varying the opening area of the air orifice 21, is disposed in a portion of the bypass air passage downstream from the hot wire sensor 6.

On the other hand, a fuel injection portion 11 is disposed in the air-intake passage 2 adjacent to the auxiliary throttle valve 10. The fuel injecting portion 11 is disposed to fit in a notch formed in the auxiliary throttle valve 11, and is composed of a small venturi 12 opening towards the direction of flow of the intake air and a plurality of nozzles 13 opening into the small venturi 12 at a right angle to the direction of flow of the intake air. The fuel injection portion 11 is connected to a fuel tank 17 through a fuel pasage 14, fuel pressure regulator 15 and a fuel pump 16. A fuel orifice 18 and a needle valve 19 for adjusting the opening area of the fuel orifice 18 are disposed at an intermediate portion of the fuel passage 14. Therefore, as the fuel orifice is opened while the fuel pump 16 is working, fuel is injected into the intake passage 2 through the nozzle 13.

The fuel needle valve 19 is disposed in a fuel passage formed vertically in the body 1 of the apparatus in alignment with the bypass air passage in which the air needle valve 2 is disposed. Therefore, the fuel orifice 18, fuel needle 19, air orifice 21 and the air needle valve 22 are disposed on the same axis. A proportional type electromagnetic device 23 is coaxially disposed between the fuel needle valve 19 and the needle valve 21, with the proportional type electromagnetic device 23 being connected to the upper part of the fuel needle valve 19 by means of an output shaft 24 around which a coiled spring is wound so as to be able to drive the fuel needle valve 19 up and down. An output shaft 25, movable in the same direction as the output shaft 24 in response to the movement of the latter, is provided on the upper portion of the proportional type electromagnetic device 23, and is connected to a lower part of the air needle valve 22. Thus, the output shafts 24 and 25, on both ends of the proportional type electromagnetic device 23 are adapted to drive the fuel needle valve 19 and the air needle valve 22 simultaneously in such a manner that the opening area of the fuel orifice 18 is increased simultaneously with a decrease of the area of the air orifice 21 and the opening area of the air orifice 21 is increased simultaneously with a decrease of the opening area of the fuel orifice 18 so that fuel is supplied from the fuel injecting portion 11 in proportion to the flow rate of the intake air.

A bellowphragm 26 is provided on the output shaft 24 so as to prevent the fuel from leaking to the outside of the body 1. The fuel leaking through the labyrinth 20 of the fuel needle valve 19 is stored in a fuel reservoir surrounded by the bellows-type diaphragm 26 and is returned to the fuel tank 17 through a return pipe (not shown).

On the other hand, the air orifice 21 is movable in the same direction as the movement of the air needle valve 22. Namely, the air orifice 21 is composed of an orifice holder 27 which is adapted to be threadably inserted into the body 1 of the apparatus, so that it is movable in the same direction as the direction of movement of the air needle valve 22 as the orifice holder 27 is rotated. A spring 28 disposed in the orifice holder 27 imparts a set load to the air needle valve 22 through a sliding member which is held in contact with the upper part of the air needle valve 22. The set load is adjustable by rotating a load adjusting screw 29 which is threaded into the orifice holder 27 to load the spring 28.

The fuel feeding apparatus having a construction described hereinbefore operates in the following manner. As the engine is started to generate a flow of air through the air-intake passage 2, a pressure difference is generated between the venturi portion 4 and a portion upstream from the latter. In consequence, the air flows through the bypass air passage 5 to the venturi portion 4 from the upstream side of the latter and the heat-sensitive resistor of the hot wire sensor 6 is cooled by the air flowing through the bypass air passage 5 to permit the detection of the intake air flow rate.

In the fuel feeding apparatus employing an ordinary air flow rate detection system making use of a hot wire sensor, the arrangement is such that, when the hot wire sensor is cooled, the processing circuit increases the electric current in the hot wire sensor to permit the hot wire sensor to recover the temperature, i.e. to permit the heat-sensitive resistor to maintain a constant temperature automatically, and the output signal from the processing circuit is directly used as the air flow rate signal in the control of the fuel feeding rate.

However, in the fuel feeding apparatus of the construction explained before, the output from the hot wire sensor 6 is delivered to the computer 9 through a processing circuit 7, and the computer 9 produces an output signal which activates the proportional type electromagnetic device 23 to enable the latter to maintain a constant air flow rate in the bypass air passage 5.

Figure 2:
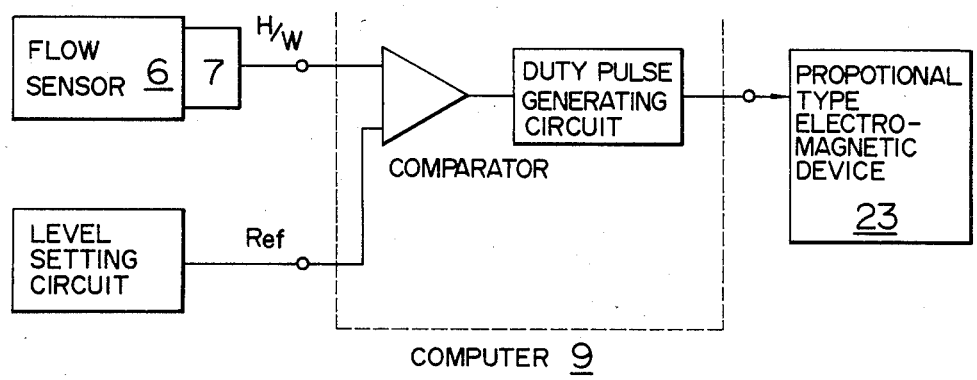
FIG. 2 is a block diagram of a processing circuit for processing the output of a heat-type air flow meter in accordance with an embodiment of the invention.

The signal processing system will be explained only briefly with specific reference to FIG. 2 because the present invention does not relate to an improvement in this system. The computer 9 includes a comparator which receives and compares a signal H/W of the hot wire sensor 6 delivered through the processing circuit 7 and a signal Ref of a predetermined set level coming from a level setting circuit. The comparator circuit includes a duty pulse generating circuit which converts the result of the comparison into a duty pulse signal in which the duty time per period is controlled in such a manner so as to make the output signal H/W from the hot wire sensor converge at the set level Rf and delivers this duty pulse signal to a proportional solenoid of the proportional type electromagnetic device 23.

The computer 9 receives also various data concerning the state of engine operation necessary for various corrections or compensation e.g. a throttle valve opening degree signal representing the state of acceleration, an idle opening degree signal representing the state of deceleration, an engine speed signal and so forth, and produces required correction or compensation signals.

Therefore, when the air flow rate in the bypass air passage 5 is increased by an increase in the opening degree of the throttle valve 3, this increase is detected by the hot wire sensor 6 which, in turn, delivers the detection signal to the computer 9 to make the latter produce a signal for activating the proportional type electromagnetic device 23. The proportional type electromagnetic device 23 drives the air needle valve 21 to decrease the opening area of the air orifice 21 until the air flow rate in the bypass air passage 5 comes down to the set level. Simultaneously with the driving of the air needle valve 22, the fuel needle valve 19 is driven by the proportional type electromagnetic device 23 to increase the opening degree of the fuel orifice 18. As a result, the fuel is supplied to the fuel injection portion at an increased rate and is mixed with the air flowing at a large flow rate to form a mixture of a predetermined air-fuel ratio which in turn is supplied to the engine. The shapes of the fuel orifice 18 and the fuel needle valve 19 are so selected as to provide predetermined air-fuel ratio of the mixture.

To the contrary, when the opening degree of the throttle valve 3 is decreased, the suction vacuum generated in the venturi portion 4 is decreased so that the flow rate of air flowing in the bypass air passage 5 is decreased to reduce the output signal from the hot wire sensor 6 to a level below the set level. As a result, the air needle valve 22 and the fuel needle valve 19 are moved in the direction opposite to that explained above, so that the opening area of the fuel orifice 18 is adjusted to decrease the fuel feeding rate by an amount corresponding to the amount of decrease of air due to closing of the throttle valve 3.

The described operation is repeated to effect a feedback control to maintain the air flow rate in the bypass air passage at a substantially constant level and the change in the flow rate of the intake air supplied to the engine is detected. Simultaneously, the fuel needle valve 19 is operated by the proportional type electromagnetic device 23 to thereby optimumly control the air-fuel ratio of the mixture to be fed to the engine. In an extraordinary state of engine operation, it is possible to attain a desired air-fuel ratio deviating from the stoichiometric one by changing the set level Ref. However, it has been often experienced that, in the event that the intake air makes a pulsation involving a blow back particularly in the heavy load operation of the engine, the mixture is made excessively rich to cause an engine stall in an extreme case. This proved to be attributable to the fact that, when the intake air makes pulsation, the backward flow component of the air in the bypass air passage 5 is detected to increase the output from the hot wire sensor 6 so that the fuel is fed at a rate greater than that corresponding to the actual flow component of the intake air, i.e., the forward flow component, as described more fully hereinbelow.

Figure 3:
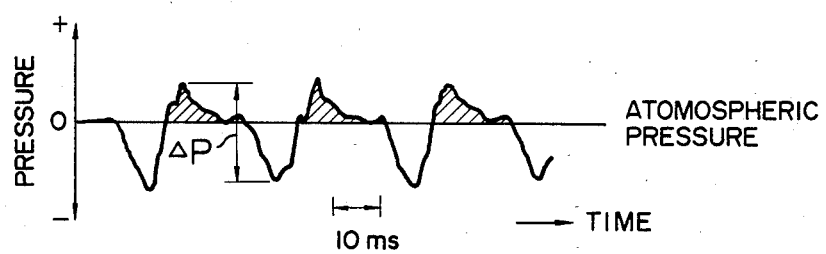
FIG. 3 is a diagram illustrating the pulsation of pressure in an air-intake passage caused by a blowback occurring in the conventional fuel feeding apparatus.

In FIG. 3, the zero presure corresponds to the atmospheric pressure. Namely, a pressure variation of ΔP is caused at period of about 30 ms. The hatched area represents the rate of backward flow of air due to the blowing back. The measurement error in the hot wire sensor 6 is caused because the latter is sensitive also to this backward flow of air represented by the hatched area. The diagram of FIG. 3 was obtained through an actual measurement with a 4-cycle 4-cylinder engine having an engine displacement of 2000 cc.

Figure 4:
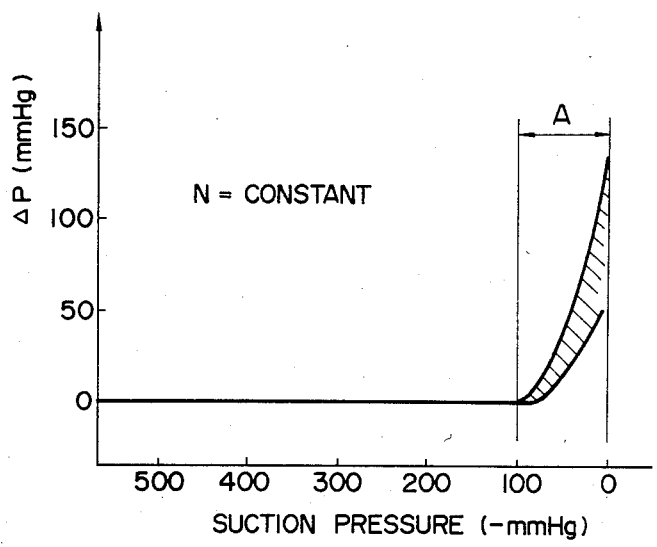
FIG. 4 is a diagram showing the relationship between the suction pressure and width of pressure variation.

In FIG. 4, intake vacuum and the pressure variation amplitude are shown in terms of mmHg and, as shown in this figure, the amplitude ΔP is abruptly increased in the region of suction pressure between −100 mmHg and zero which represents full opening of the throttle valve 3. This tendency some what varies depending on the engine speed, and is distributed in the hatched area in the range A in which the engine speed is varied. This phenomenon is common to all types of engines, although there is a slight difference according to the type of the engine, and the amplitude ΔP of pressure variation well reaches 100 to 150 mmHg.

A restricting portion for controlling the flow rate of bypassing air, composed of the air orifice 21 and the air needle valve 22, is disposed at an intermediate portion of the bypass air passage 5 of the fuel feeding apparatus under consideration, and it is necessary to control the effective area of the restricting portion in a manner which will be explained hereinunder.

Figure 5:
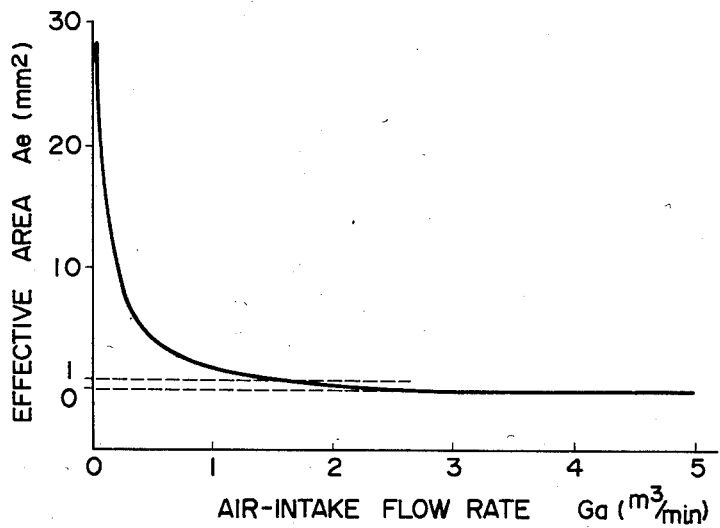
FIG. 5 is a diagram showing the variation in the effective area of air restricting portion for maintaining a constant air flow rate in the bypass air passage employed by the conventional fuel feeding apparatus.

In FIG. 5, the abscissa represents the intake air flow rate Ga (unit $m^3/mm$) while the ordinate represents the effective area Ae (unit $mm^2$). The effective area of the restriction is extremely small in the heavy-load range in which there is a possibility of the blowing back occurring. The inside diameter of the bypass air passage 5 in which the hot wire sensor 6 is installed is about 8 to 10 mm. However, the effective area of the restriction is reduced to a level below 1 mm in diameter in the range in which the blowing block occurs. In other words, the bypass air passage 5 is materially blocked by this restriction. Therefore, the relationship between the air pressure P in the air-intake passage 2 and the output voltage V of the hot wire sensor 6 in the blowing back region was measured in the state in which the above-mentioned restriction is fully closed and the bypass passage 5 is connected at its inlet side to the portion of the intake passage 2 downstream from the air cleaner, the result of which is explained below.

Figure 6:
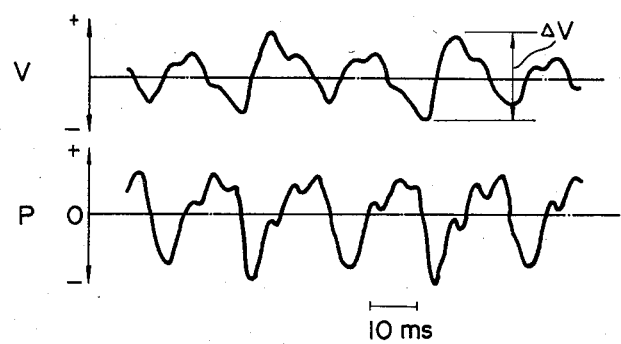
FIG. 6 is a diagram showing how the output voltage of a heat-type flow meter and the pressure blow back are varied when the air restricting portion in the bypass air passage is closed.

As shown in FIG. 6, although there is no flow of air around the hot wire sensor 6, the latter produces an output due to a movement of air caused by the presure variation attributable to the flowing back. Namely, an apparent flow of air is produced by a repeated compression and expansion of air in the bypass air passage 5. The level of the output becomes greater as the amplitude of the presure variation and the length of the bypass air passage 5 become greater.

Figure 7:
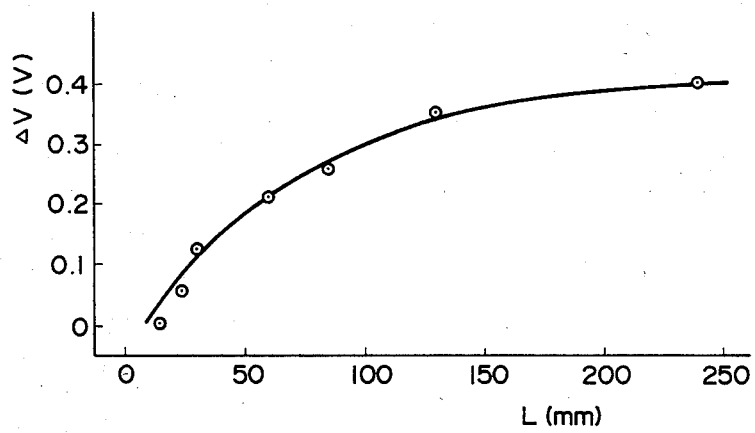
FIG. 7 is a diagram showing the relationship between the distance of the heat-type air flow meter from the closed air restricting portion and the amplitude of the output voltage of the heat-type flow meter.

FIG. 7 shows the relationship between the distance of the hot wire sensor 6 from the blocked restricting portion and the amplitude $\Delta V$ of the output voltage of the hot wire sensor 6. It will be seen from FIG. 7 that the amplitude $\Delta V$ becomes greater, i.e. the air flow velocity is increased, as the distance L gets larger.

Figure 8:
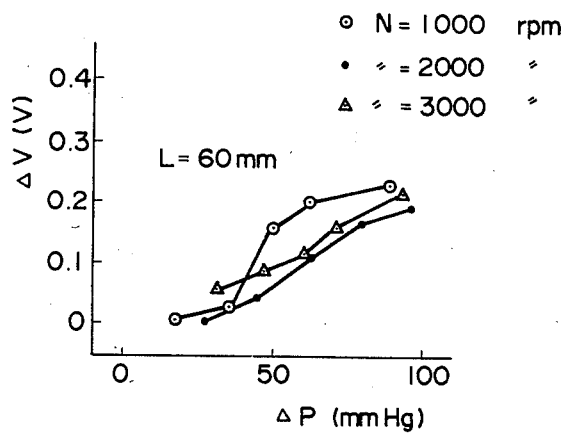
FIG. 8 is a diagram showing the relationship between the amplitude of pressure variation in the intake passage and the amplitude of the output voltage of the heat-type air flow meter.

FIG. 8 shows the relationship between the amplitude $\Delta P$ of presure variation in the intake air passage and the amplitude $\Delta V$ of the output voltage using the engine speed as the parameter and fixing the length L and 60 mm. The pressure variation amplitude $\Delta P$ is substantially proportional to the voltage amplitude $\Delta V$, and this proportional relationship is not changed substantially even when the engine speed is changed. This may be attributed to the fact that the presure waveform largely varies depending on the level of the engine speed N. The most rapid presure change is observed when the engine speed N is 1000 rpm. At this speed, the voltage amplitude $\Delta V$ also takes a greater level than at other speeds.

From this test result, it is understood that the extraordinary enrichment of the air-fuel mixture in the heavy load operation of the engine is attributable to the fact that the influence of the repeated compression and expansion of the air around the hot wire sensor 6 in the bypass air passage 5, caused by a pressure pulsation occurring in the bypass air passage 5 due to blowing back, is added in the output from the hot wire sensor 6 to demand a greater rate of fuel feeding than that corresponding to the actual air flow rate.

Therefore, in order to prevent excessive enrichment of the mixture in the heavy load operation of the engine, it is an effective measure to check the backward flow of the air to prevent the expansion component, i.e. backward flow, of the air caused by the pressure variation from acting on the heat-type air flow meter or to suppress the pressure pulsation in the bypass air passage 5.

Referring again to FIG. 1, a cylindrical swirl chamber 30 having a backward flow preventing function is disposed in the portion of the bypass air passage 5 downstream from the hot wire sensor 6. The swirl chamber 30 is connected to this portion of the bypass passage 5 such that its axis intersects the axis of the upstream portion of the bypass air passage 5 at a right angle, and the downstream prtion of the bypass air pasage 5 is arranged such that the inner wall thereof smoothly and tangentially merges in the wall defining the swirling chamber 30. Therefore, the forward air can smoothly flow through the central portion of the swirl chamber 30 as shown by full line in FIG. 1, without encountering substantial resistance. However, the backward air produces a large flow resistance because it flows tangentially into the swirl chamber and swirls along cylindrical wall of the swirling chamber 30, so that the tendency of backward flow of air in the bypass air passage 5 is effectively suppressed. The swirl chamber 30 also functions as a surge tank to further contribute to the suppression of occurrence of the backward flow.

Figure 9:
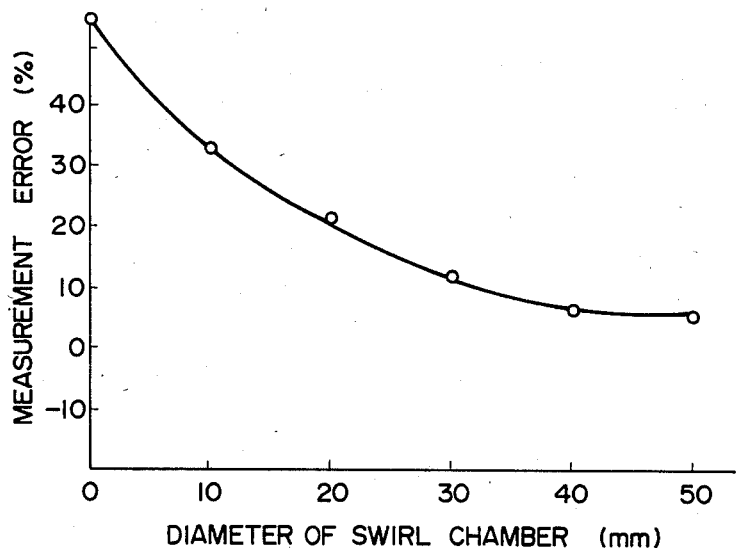
FIG. 9 is a diagram showing the measurement error occurring in the heat-type air flow meter due to a pulsation in the intake air pressure when a throttle valve is fully opened in the embodiment of the invention shown in FIG. 1.

In FIG. 9, abscissa represents the diameter of the cylindrical swirl chamber in mm. According to the test results, the measurement error is decreased as the diameter of the swirl chamber 30 is increased, and finally falls within the range below +5%. When the apparatus is used in automotive engines, however, a measurement error of about +10% is acceptable so that the diameter of the swirl chamber 30 of about 30 mm is sufficient from a practical point of view.

Figure 10:
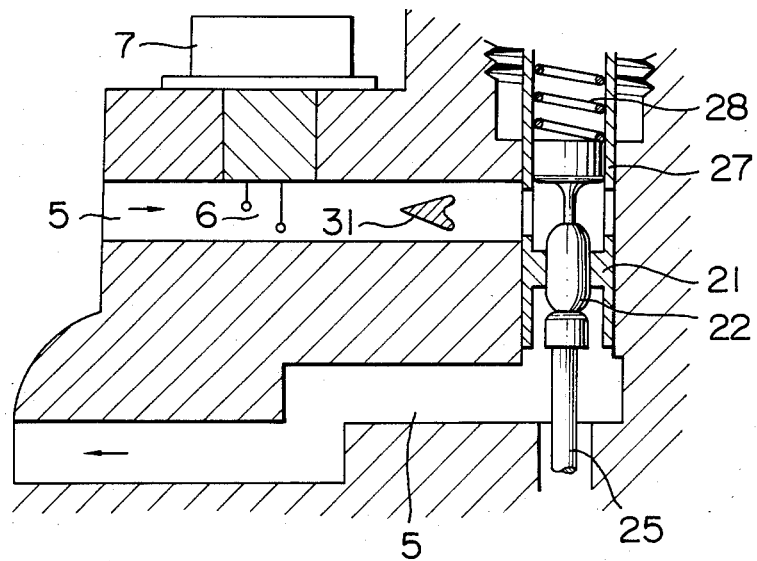
FIG. 10 is an enlarged sectional side elevational view of a portion of another embodiment of the invention.

As shown in FIG. 10, a conical backward flow prevention member 31 is supported in the bypass air passage 5 by supports (not shown) extending radially inwardly from the wall of the bypass air passage 5 such that the pointed end thereof is directed to the upstream side as viewed in the direction of forward flow of the air. Therefore, the forward air can smoothly flow along the side surface of the conical backward flow prevention member 31 whereas the backward air is effectively checked by the bottom surface of the backward flow prevention member 31.

Figure 11:
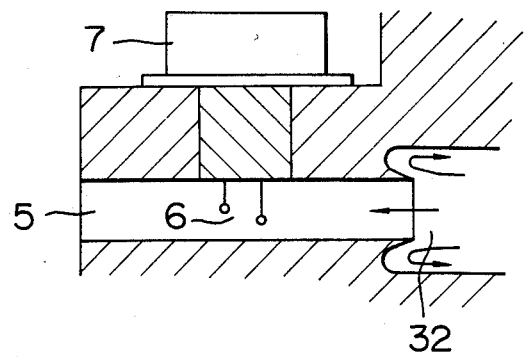
FIG. 11 is an enlarged sectional detail view of an of still another embodiment of the invention.

In FIG. 11, the portion of the bypass air passage 5 downstream from the hot wire sensor 6 has an increased diameter. At the same time, a backwards flow prevention portion 32 is formed by projecting the end edge of the upstream small passage into the downstream portion of the increased diameter so as to oppose to the backward flow of the air. According to this arrangement, it is possible to suppress more than a half part of the backward flow of the air due to a collision with annular recess formed between the projected edge of the passage portion of small diameter and the passage portion of increased diameter. In this embodiment, therefore, it is possible to reduce the influence of the backward air flow on the air flow meter by a simple change of the shape of the bypass air passage 5.

Figure 12:
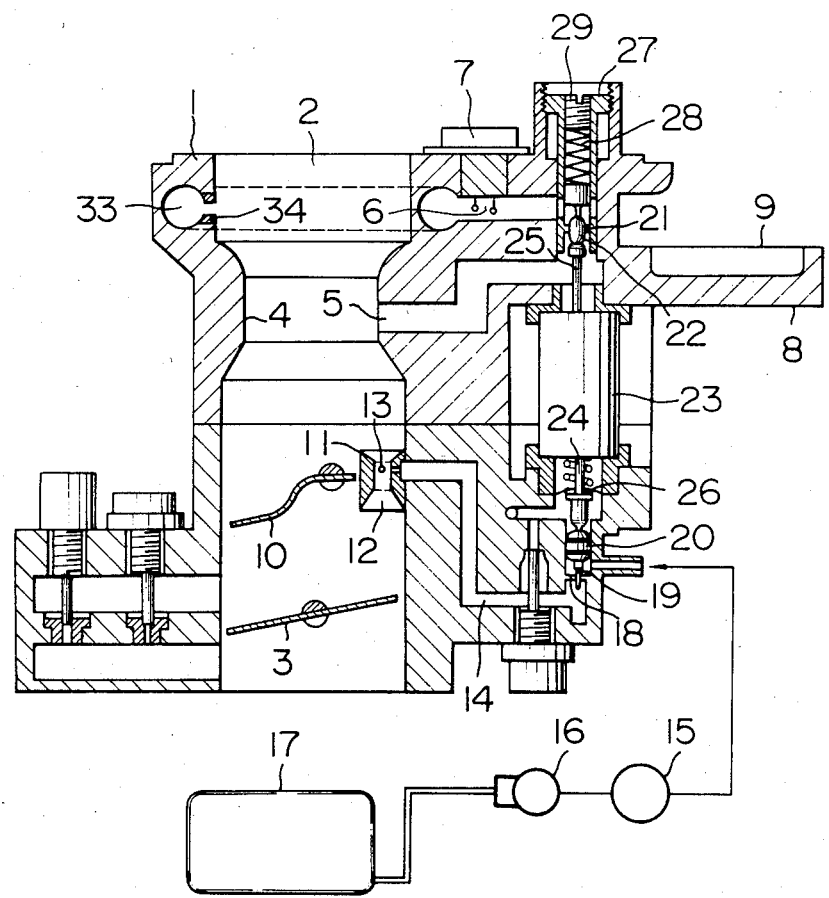
FIG. 12 is a sectional view of a fuel feeding apparatus in accordance with a further embodiment of the invention.

In FIG. 12, a surge tank 33, functioning to suppress the pressure variation is disposed in the bypass air passage 5 at the upstream side of the hot wire sensor 6.

The surge tank 33 has an inside diameter greater that of the bypass air passage 5, and has a form of an annular passage surrounding the air-intake passage 2. The surge tank 33 is communicated with the intake passage 2 through an orifice 34 at a position opposing the position of connection of the bypass air passage 5 across the air-take passage 2. The use of the orifice 34 makes the influence of the machining precision of the surge tank 33 negligibly small and, hence, permits the production of the apparatus by casting. Namely, it is possible to make the requirement for the machining precision of the surge tank 33 less severe by finishing the orifice 34 at a high precision.

Figure 13:
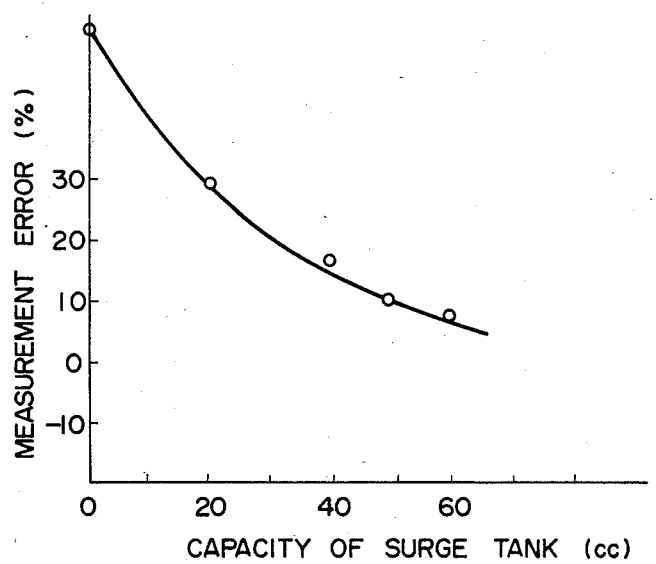
FIG. 13 is a diagram showing the measurement error occurring in the heat-type air flow meter caused by a pulsation of intake air pressure when the throttle valve is fully opened in the embodiment show in FIG. 12.

In FIG. 13, the abscissa represents the volume of the surge tank (unit cc). Similarly to the test result shown in FIG. 9, the surge tank is practically usable in automotive engines provided that the volume thereof is at least 50 cc which causes an error of about +10%.

Figure 14:
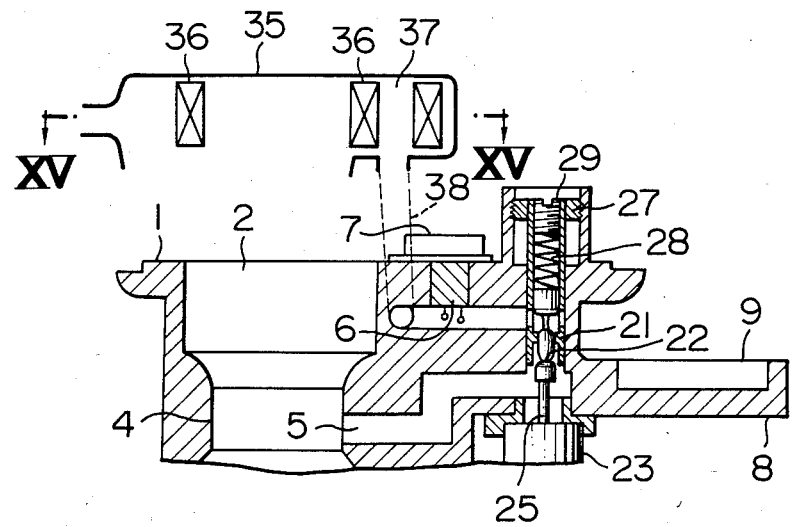
FIG. 14 is a sectional detail view of a still further embodiment of the invention.
Figure 15:
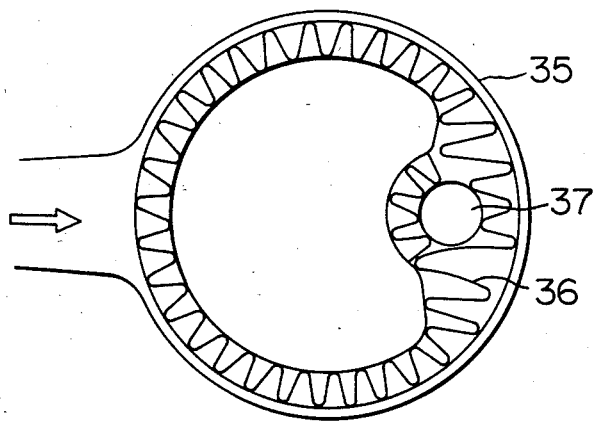
FIG. 15 is a sectional view taken along the line A—A of FIG. 14.

As shown in FIG. 14, the inlet 37 of the bypass air passage 5 is disposed between adjacent elements 36 of an air cleaner for cleaning intake air. The passage portion between the air cleaner 35 and the fuel feeding apparatus 1 is formed of an airtight flexible pipe 38. As will be seen from FIG. 15, since the inlet 35 of the bypass air passage opens between adjacent elements in this embodiment, the long inlet passage functions as the surge tank and, in addition, the bypass air passage can receive cleaned air. In consequence, any deposition of dust or other contaminants on the hot wire sensor 6 and the air restriction is avoided to ensure safe operation of the hot wire sensor 6 and the air restriction.

Figure 16:
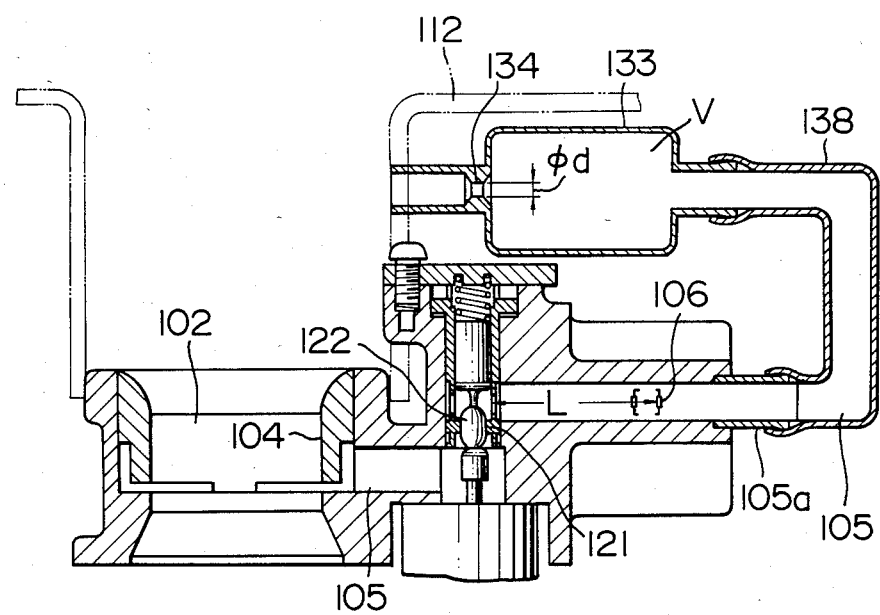
FIG. 16 is a sectional detail view of yet another embodiment of the invention.

As shown in FIG. 16, an air-intake passage 102 includes a venturi portion 104, and a bypass air passage 105. The embodiment of FIG. 16 further includes hot wire sensor 106, air orifice 121, and an air needle valve 122, with passage 112 being provided between the air cleaner and the apparatus. These components operate in materially the same manner as corresponding parts in the preceding embodiments. In FIG. 16, the surge tank 133 is disposed at the outer side of the fuel feeding apparatus and is opened to the portion of the air-intake passage between the air cleaner and the apparatus. The surge tank 133 is connected also to the inlet 105a of the bypass air passage through a pipe 138. An orifice 134 is disposed at the inlet portion of the surge tank 133.

Experiments have shown that the following relationships exist between the volume V of the surge tank 133, diameter d of the orifice 134 and the distance between the air orifice 121 and the hot wire sensor 106.

Figure 17:
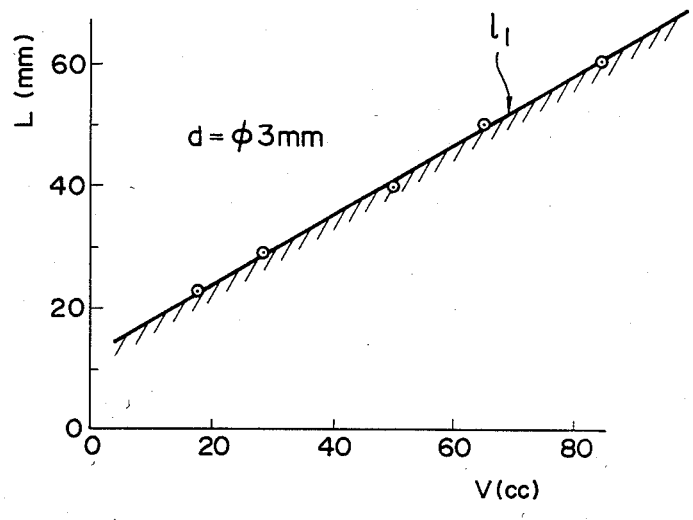
FIG. 17 is a diagram showing the relationship between the volume V of a surge tank and the distance L of the air restricting portion in the bypass air passage from the heat-type air flow meter, as observed when the diameter d of the orifice in the illustrated embodiment is 3 mm.

Namely, FIG. 17 provides an illustration of the relationship between the volume V and the distance L as observed in the apparatus shown in FIG. 16 when a orifice having a diameter d of 3 mm is used. This diagram is drawn by varying the distance L to increase the volume V of the surge tank 133 until no backward flow of the air due to the air pressure pulsation is detected by the hot wire sensor 106. Appreciable effect of the surge tank is obtainable in the hatched region under the full line $l_1$. It will be seen that a sufficient effect is attainable even with a surge tank of a small volume V, provided that the distance L is small.

Figure 18:
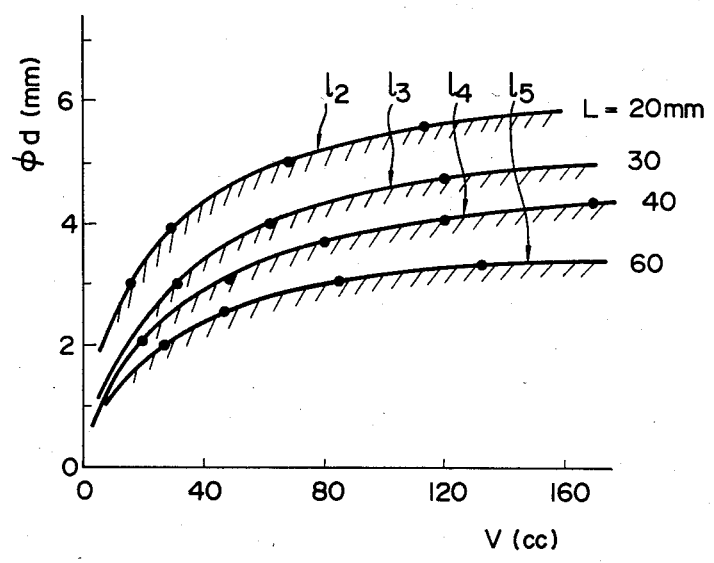
FIG. 18 is a diagram for determining the range in which the heat-type air flow meter becomes unable to detect the backward flow of intake air when the values of factors d, L and V in the embodiment of FIG. 16 are changed.

FIG. 18 is a diagram showing the regions in which no backward flow of air due to pressure pulsation is detected as observed when three factors, i.e. the volume V, diameter d and the length L are changed. These regions are shown as hatched areas beneath the full-line curves representing the distances L. The region in which no backward flow is sensed is widened as the length L gets smaller. In each case, it is necessary to increase the volume V of the surge tank when the diameter d of the orifice is large. For instance, in the case that L is 40 mm, while the volume of 50 cc is sufficient when the diameter is 3 mm, the volume V has to be increased to 120 cc or greater if the diameter d is increased to 4 mm.

Figure 19:
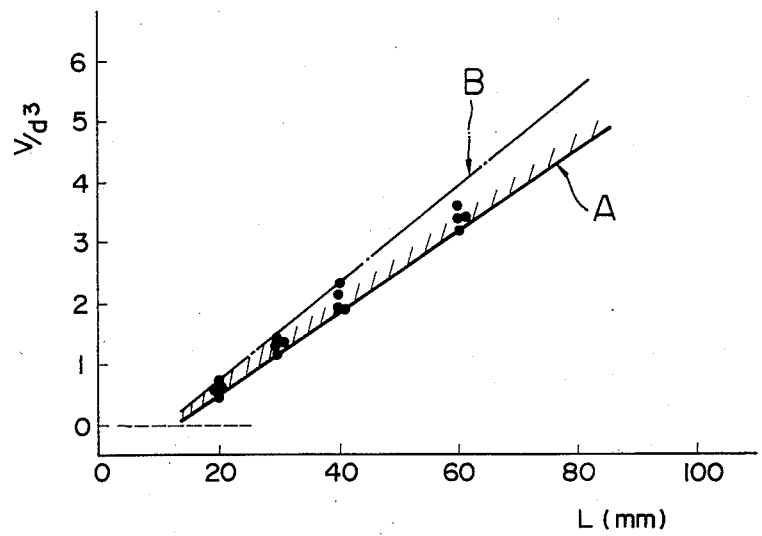
FIG. 19 is a diagram showing the how the factors d, V and L are related to one another.

FIG. 19 is a diagram which summarizes the above-mentioned relationship existing among the three factors V, d and L. More specifically, abscissa represents the distance L, while the ordinate represents a value given by $V/d^3$. In this Figure, the influence of the pressure pulsation is negligible in the region above the full-line curve A. Although a slight fluctuation of the plotted points is found, it is understood that the threshold or critical values exist on a substantially linear straight line laid between the full line A and the one-dot-and-dash line B.

An experimental formula is worked out in accordance with the characteristics shown by the full line A as follows:

$$V/d^3 = 0.0675\ L - 0.9 \tag{1}$$

where, the volume V is expressed by cc while the diameter d and L are represented by mm.

In order to avoid the influence of the pressure variation, it is necessary that the design be made to fall within the range above the full line A, so that the following condition is derived:

$$V/d^3 \geqq 0.0675\ L - 0.9 \tag{2}$$

To make sure of the safety, it is necessary to employ a safety factor of an order of about 20% to draw the line of practical upper limit, so that the following condition (3) is derived:

$$V/d^3 \geqq 0.081\ L - 0.9 \tag{3}$$

Figure 20:
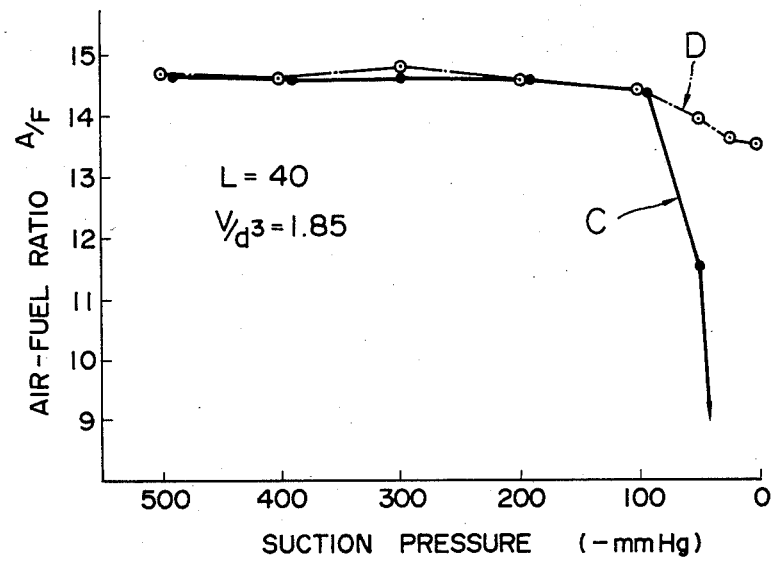
FIG. 20 is a diagram showing the operation characterics of the fuel feeding apparatus embodying the present invention shown in FIG. 16 in comparison with that of a conventional fuel feeding apparatus.

In FIG. 20, the operation characteristics of the conventional apparatus and the apparatus of the invention, as obtained with a distance value L of 40 mm and engine speed N of 1000 rpm are shown by a full-line curve C and one-dot-and-dash line D, respectively. As shown in FIG. 20, the air-fuel mixture becomes excessively rich to cause a misfire or, in the worst case, an engine stall when the suction vacuum is reduced to a level below 50 mmHg in the conventional fuel feeding apparatus. This tendency becomes serious also when the engine speed N is increased. In contrast to the above, in the fuel feeding apparatus embodying the invention, the reduction of air-fuel ratio, i.e. the excessive enrichment of the mixture, is suppressed to ensure a smooth engine operation even when the suction vacuum is reduced to a level below 100 mmHg to allow the unfavorable blowing back.

Each of the embodiments described hereinbefore has either one of the backward flow prevention function and a pressure pulsation suppressing function. It is to be understood, however, that the fuel feeding apparatus of the invention can simultaneously employ both of these functions.

Figure 21:
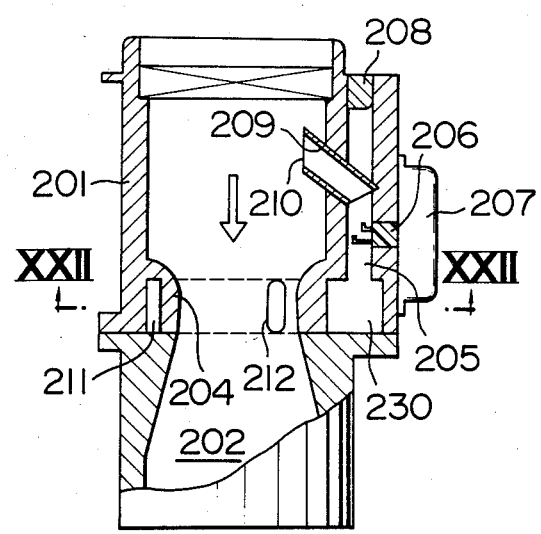
FIG. 21 is a sectional detail view of another embodiment of the invention.
Figure 22:
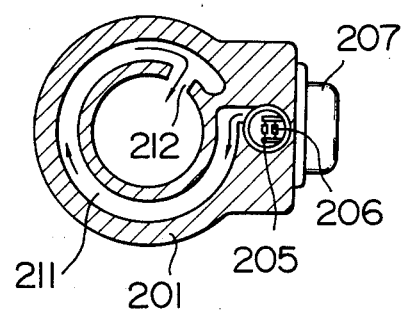
FIG. 22 is a sectional view taken along the line B—B in FIG. 21.

More particularly, FIG. 21 provides an example of an embodiment in which these two functions are simultaneously employed. As shown in FIG. 21, a body 201 of a fuel feeding apparatus includes an air-intake passage 202 having a venturi portion 204 provided therein. A hot wire sensor 206 is disposed in a bypass air passage 205 and a processing circuit is mounted on the body 201. The bypass air passage 205 is formed as a bore which extends from the upper end of the body 201 in parallel with the air-intake passage 202, and is closed at an end by an end plug 208. The inlet of the bypass air passage 205 is constituted by a pipe 8 extending through the body 201 and opening to the air-intake passage 202 and the bypass air passage 205. In the embodiment of FIG. 21, the pipe 8 is attached at an inclination to the direction of flow of the intake air. The end surface of the pipe 8 projected into the suction passage 202, i.e. the inlet end surface 210, is extended substantially in parallel with the flow of the intake air flow. The lower end of the bypass air passage 205, extending in parallel with the air-intake passage 202, is connected to a cylindrical swirl chamber 230 disposed coaxially with the bypass air passage 205 at a position corresponding to the throat of the venturi portion 204. An annular outer peripheral passage 211 is formed so as to surround the venturi portion 204. The outer peripheral passage 211 has a rectangular cross-section and is connected at its one end to the swirl chamber 230 through a linear passage portion which is connected tangentially to the swirl chamber 230 while the other end is opened as at 212 to communicate with the venturi portion 204.

As in the case of the swirl chamber 30 of FIG. 1, the swirl chamber 230 of the embodiment of FIG. 21 receives the backward flow of air in the tangential direction thereto, so that the backward flow of air is made to swirl along the wall of the swirl chamber 230. in consequence, the bypass air passage 205 mounting the hot wire sensor 206 is effectively freed from the backward flow of air. In addition, the length of the bypass passage is increased due to the employment of he outer peripheral passage 211 below the swirl chamber 230 and providing a communication between the bypass air passage 205 to the venturi portion 204, it is possible to increase the inertia of the air moving in the bypass air passage. It is, therefore, possible to eliminate any substantialy influence of the pulsation of the flow of intake air to maintain a stable and steady flow of the air in the bypass air passage even when the engine is operated in such a region as to permit the ocurrence of the blowing back.

As has been described, according to the invention, there is provided a fuel feeding apparatus for internal combustion engines, of the type having a heat-type sensor disposed in a bypass air passage detouring the intake passage and adapted to detect the flow rate of intake air thereby to maintain the air flow rate in the bypass air passage substantially constant and, at the same time, to control the fuel feeding rate, wherein the improvement comprises a pulsation suppressing means disposed in the bypass air passage and adapted to suppress the pulsation of air flow in the bypass air passage thereby to decrease the measurement error, whereby the air-fuel mixture of optimum air-fuel ratio in accordance with the set air-fuel ratio is formed and supplied to the engine over the entire region of the engine operation. In addition, the invention makes it possible to produce at low cost a fuel feeding apparatus having distinguished performance with a high response characteristics of the fuel supply, without being accompanied by any substantial complication of the electronic controller.

Needless to say, the fuel feeding apparatus can be applied to ordinary internal combustion engines other than the automotive engines, while the fuel feeding apparatus of the invention has been described through several preferred forms applied to automotive engines. Thus, the described embodiments are not exclusive and various changes and modifications are possible without departing from the scope of the invention which is limited solely by the appended claims.

What is claimed is:

1. A fuel feeding apparatus for internal combustion engines, the fuel feeding apparatus comprising: an air-intake passage provided with a venturi portion therein; a throttle valve disposed in the portion of said air intake passage downstream of said venturi portion as viewed in a direction of flow of the intake air; a fuel injection portion disposed in the portion of said air intake passage between said throttle valve and said venturi portion; a bypass air passage opening into and interconnecting a portion of said intake passage upstream from said venturi portion and said venturi portion; a heat-type air flow meter disposed in said by-pass air passage for detecting the change of flow rate of air flowing in said bypass air passage; a backward flow suppression means disposed in the portion of said bypass air passage downstream from said heat-type air flow meter for suppressing a backflow component of air by disrupting the air flow downstream of the air flow meter while permitting a forward flow component to smoothly pass therethrough.

2. A fuel feeding apparatus according to claim 1, wherein said backward flow suppressing means includes a swirl chamber having a portion of a substantially circular cross-section, said swirl chamber being connected to an upstream portion of said bypass air passage so as to permit the forward flow of air to smoothly flow through a substantially central portion thereof and also connected to the downstream portion of said bypass air passage in such a manner that a backward air flow flows into said portion of said substantially circular cross section tangentially and then swirls along a wall of said portion of said substantially circular cross section.

3. A fuel feeding apparatus according to claim 2, wherein said swirl chamber has a cylindrical form and wherein said upstream portion and said downstream portion of said bypass air passage align with each other in the axial direction of the cylindrical swirl chamber and extend in opposite directions from said swirl chamber.

4. A fuel feeding apparatus according to claim 2, wherein said swirl chamber has a cylindrical form, and the upstream portion of said bypass air passage is connected to one end of said swirl chamber coaxially with said cylindrical swirl chamber.

5. A fuel feeding apparatus according to claim 1, wherein the backward flow suppressing means includes a conical backward flow suppressing member disposed in said bypass air passage with a pointed end thereof directed toward an upstream side as viewed in the direction of flow of air.

6. A fuel feeding apparatus according to claim 1, wherein said backward flow suppressing means includes a backward flow preventing portion of said bypass air passage, said backward flow preventing portion being formed by increasing on inside diameter of said bypass air passage at the downstream portion as compared with the upstream portion and projecting the end edge of said upstream portion into said downstream portion of increased diameter so as to oppose to the backward flow of air.

* * * * *